June 30, 1959    S. D. ROSS    2,892,972
CAPACITORS
Filed Sept. 10, 1954
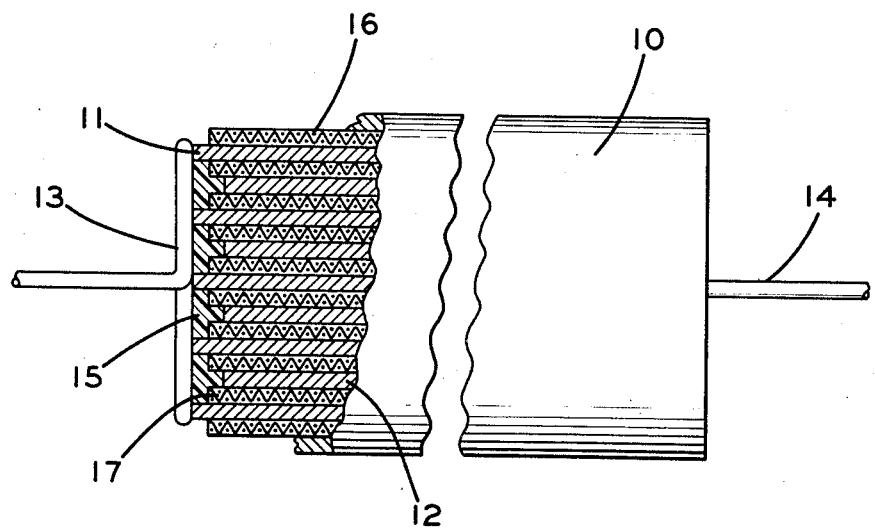
SIDNEY D. ROSS
*INVENTOR.*
BY *Connolly and Hutz*
HIS ATTORNEYS United States Patent Office 2,892,972
Patented June 30, 1959

2,892,972
CAPACITORS

Sidney D. Ross, Williamstown, Mass., assignor to Sprague Electric Company, North Adams, Mass., a corporation of Massachusetts Application September 10, 1954, Serial No. 455,116

7 Claims. (Cl. 317—258)

This invention relates to improved electrical capacitors and more particularly refers to resin impregnated capacitors possessing unusual high temperature characteristics.

This is a continuation-in-part of my copending patent application, Serial No. 287,496, filed May 13, 1952, now abandoned.

Resin impregnated capacitors are not broadly new. For example, paper capacitors have been impregnated with styrene and with N-vinyl carbazole followed by polymerization in situ to form a rigid capacitor unit with electrical properties in some respects superior to oil and wax impregnated paper capacitors. Unfortunately, such units, though employing as a resin a material with good electrical properties, do not in fact possess characteristics much superior to those of other types; in particular, the maximum operational temperature is limited, for example, about 85° C. for polystyrene and about 125° C. for poly N-vinyl carbazole. Even at temperatures of this order the electrical properties such as insulation resistance and "Q" are appreciably lower than would be expected from a knowledge of the characteristics of the massive resin.

In order to obtain higher softening temperatures and thus to permit molding of casings and the like about the capacitor, it has been common practice to impregnate paper capacitors with a mixture of styrene with a polyfunctional unsaturated polyester. The resulting co-polymer is thermosetting in nature and thus meets the physical objective. However, the polyester material is polar in nature and contributes significantly to a lowering of leakage resistance and increase in power factor, particularly at elevated temperatures.

To my knowledge, none of the condensers referred to above are suitable for operation at temperatures on the order of 150° C. or higher, whether the impregnant be a polar or non-polar resin.

It is an object of the present invention to overcome the foregoing and related disadvantages. A further object is to produce new and useful electrical capacitors, particularly suited for operation at elevated temperatures. Additional objects will become apparent from the following description and claims.

These objects are attained in accordance with the invention wherein there is produced an electrical capacitor comprising electrodes convolutely wound with porous dielectric spacers, said spacers being substantially completely impregnated with an unsaturated co-polymer of (a) a linear polymer of a conjugated diene containing unsaturation along the chain, (b) a vinyl aromatic compound, and (c) a polyfunctional cross-linking compound.

In a more restricted sense the invention is concerned with an electrical capacitor comprising electrodes convolutely wound and separated by porous dielectric spacing material impregnated with an unsaturated co-polymer of from about 30 to about 70% polybutadiene, from about 30 to about 80% styrene and from about 0.1% to about 10% of a divinyl benzene.

This invention is featured by the use of a normally liquid system comprising about 39 parts by weight of polybutadiene, about 52 parts by weight of a vinyl aromatic compound, about 1 part by weight of diethyl benzene, about 6 parts by weight of divinyl benzene and about 2 parts by weight of tertiary butyl peroxide.

These mixtures are suitable for impregnation at room temperature in a capacitor having electrodes separated by a porous spacer, and polymerize to a rigid mass by curing at a temperature in excess of 125° C.

While cross-linked co-polymers as such are not broadly new, having been used in the formation of castings, machineable rods and the like, they have not been applied to capacitors as impregnants with any real degree of success. While I am not fully aware of the reasons therefore, I have discovered that a certain type of co-polymer will give heretofore unattainable results when employed as the impregnant of an electrical capacitor. This co-polymer is one in which the finished resin actually includes in its molecular structure a substantial percentage of unsaturation, that is, aliphatic carbon-to-carbon double bonds. While it might have been thought that the presence of such unsaturation would actually contribute to instability in a resin, as well as inferior electrical properties, I have found that with the class of resins of my invention the opposite is true.

In contrast to the various types of resins previously used as capacitor impregnants, I employ as a constituent in the copolymer system a moderately high molecular weight substantially aliphatic polymer of a diene, that is, a chain which possesses not only terminal unsaturation, which permits it to enter into the ultimate copolymerization reaction, but also unsaturation along the chain. It does not appear that this chain unsaturation enters completely into the copolymerization reaction, but as I have indicated above, it does appear to improve the ultimate electrical properties of the copolymer. Preferred among those polydienes are the aliphatic types of a liquid character, such as polybutadiene. These liquid polydienes are of such viscosity that when incorporated into the final impregnating solution result in an impregnant having a viscosity of about 0.8 poise. In these relatively low molecular weight polydienes typical molecular weights are, for the preferred polybutadiene, from about an average of 1500 to about 2500, is quite satisfactory. The percentage of the polydiene had been cited as being from about 30% to about 70%. This range was established by the following properties of the system. If too small a percentage, that is less than 30% of the polydiene, is used, the units when impregnated are found to have relatively low breakdown voltages and are most susceptible to failures on flashing of the units, particularly the metalized type. If the percentage is above 70%, it is extremely difficult to polymerize without going to excessive temperatures which would have a deleterious effect on the units.

In addition to the polybutadiene normally employed, other structurally similar compounds are of utility. Included among these are moderately low polymers of divinyl acetylene, and pentadiene-1,3.

The second constituent of the impregnating material is a vinyl aromatic monomer such as styrene, dichlorostyrene, vinyl biphenyl, chlorostyrene, para methyl styrene, pentachlorostyrene and the like. The limits of the vinyl aromatic monomer as indicated is between about 30% and about 80% by weight. Once again if the concentration of the vinyl aromatic, such as the preferred vinyl toluene, is too high, relatively low breakdown voltages are noticed in the units and if too low, that is less than 30%, the system is extremely difficult to polymerize without raising polymerization conditions to an excessive temperature.

The third constituent is a cross-linking agent consisting of a poly-functional vinyl compound, that is, one having at least two functional groups. While divinyl benzene is a preferred example of such a material, any of the three isomers being suitable, trivinyl benzene, divinyl tetrachlorobenzene, and sym-trivinyl trichlorobenzene are also suitable cross-linking agents. Diallyl phthalate may also be used. The amount of this agent required to obtain the desired thermosetting character in the vinyl copolymer varies from about 0.1 to about 10% with the usual working range being from about 1% to about 5%. The limitation upon the percentage of bifunctional compound which is present is determined by the brittleness of the system. With amounts of bifunctional compound in excess of 10% it is noted that the units consistenly suffer cracks and fractures in sections when they are subsequently encased in a molded thermoset resin under pressure and temperature.

In addition to the three basic constituents referred to in the previous paragraphs it is ordinarily desirable to employ a peroxide polymerization catalyst in order to accomplish the polymerization within the desired temperature and time range. The percentage of peroxide catalyst normally employed is from about 0.1% to about 3%. The catalyst is volatilized away from the resin during polymerization and only insignificant amounts are retained. The percentage of catalyst is determined generally by the minimum amount which will effect polymerization, and the decrease in pot life of the resin. Suitable and typical catalysts include cumene hydroperoxide, benzoyl peroxide, tertiary butyl hydroperoxide, acetyl peroxide, lauroyl peroxide and the like. A preferred catalyst is ditertiary butyl peroxide which becomes active upon reaching a temperature of about 125° C. Thus, my system remains substantially inactive at room temperatures, in fact, the pot life of the system is found to be of periods exceeding a year.

As a typical example of the practice of my invention reference should be made to the figure of the drawing which illustrates in partial cross-section a capacitor comprising the invention. The capacitor was prepared by winding, convolutely and non-inductively, two thin co-operating foils 11 and 12 with dielectric spacers 16 and 17. The foils 11 and 12 were lengths of .00025" thick aluminum with the dielectric spacers 16 and 17 comprising a total thickness of 0.9 mil of calendered kraft paper. Though foils were indicated in the sole figure, equally satisfactory for this invention are metallized dielectric films. These films are preferably of a porous nature, such as exemplified by kraft and linen paper. The metallized coating imposed on the surface of the paper spacer is of the vacuum deposited type using such metals as zinc, aluminum, lead, etc. This vacuum deposition is imposed upon the film and where the porous type film is used, an intermediate coating of lacquer is first applied for the metallized layer to be deposited upon. Such lacquers include cellulose acetate sorbate, cellulose acetate nitrocellulose, etc. Terminal end connections 13 and 14 are each electrically connected to their respective foils 11 and 12 with the entire unit enclosed in the capacitor outer casing 10. The dielectric spacers 16 and 17 were impregnated with the following solution. 40 parts by weight of polybutadiene, of viscosity 0.8 poise with one double bond for every 48 molecular weight units; 50 parts by weight of styrene; 9 parts by weight of 55% divinyl benzene in a solution of ethyl vinyl benzene; and 1 part by weight of cumene hydroperoxide. The impregnant 15 polymerizes in situ to substantially fill all the previously existing voids within the capacitor section.

The capacitor sections were vacuumed dried at 125° C. and then impregnated in a closed system under reduced pressure with the solution referred to above, the temperature being reduced to 80° C. for the impregnation. After impregnation the system was opened and the sections were retained in the solution for one hour. The units were then removed from the solution and subjected to polymerizing conditions. The units, preferably in the absence of air, were maintained at 50° C. for 8 hours, one hour at 60 to 70° C., five hours at 80° C. and finally baked at 120° C. for twelve hours.

The units were life tested initially for 250 hours at 85° C. without failure at 600 v. D.C. (150% of rated voltage). They were subjected first to 600 v. D.C. for 250 additional hours at 125° C. and then to 600 v. D.C. for 250 additional hours at 150° C. without any failure. At the end of these extended and severe life tests the insulation resistance at room temperature was in excess of 20,000 megohm microfarads.

In contrast to the above life test results, similar paper capacitors impregnated with N-vinyl carbazole, followed by polymerization in situ, failed on life test at 150° C. At 125° C. they possessed low insulation resistance and 40% of the units tested failed within 250 hours at 125% of rated voltage at 125° C.

Further capacitor sections of aluminum electrodes and paper spacers similar to that set forth in the drawing were vacuum dried at 125° C. and thereafter impregnated in a closed system with a solution having the following composition:

|  | Average Molecular Weight | Percent |
| --- | --- | --- |
| Polybutadiene | 1,500 | 32 |
| Vinyl toluene |  | 49 |
| Divinyl benzene |  | 6 |
| Ethyl vinyl benzene |  | 2.9 |
| Diethyl benzene |  | 0.9 |
| Tertiary butyl peroxide |  | 2.0 |

The ethyl benzene set forth in this application results from the use of commercial divinyl benzene which has less than 10% of ethyl benzene present. Its presence is not essential to the inventive concept. The temperature was reduced to 15° C. for impregnation at which temperature the impregnant has a viscosity of 0.8 poise. After impregnation, which was carried on for 60 minutes, the system was opened and the sections were retained in the impregnant solution for one hour. The units were then removed from the solution and subjected to polymerizing conditions. The units, preferably in the absence of air, were maintained at 120° C. for ½ hour followed by 8 hours at 150° C. At this time the sections were found to be of a thermoset resinous nature and can be readily molded with an outer casing of a mineral filled thermoset resin as phenolformaldehyde. This molded encasement is obtained without deformation of the enclosed section which is an extremely difficult condition to obtain with the wet or dry molded capacitor sections as currently practiced. These molded units which were of a .15 mfd., 600 v. rating, having 0.0003" paper spacers, were subjected to 125° C. operation at 1.5 times rated voltage for a period of 500 hours without noticeable deterioration of the electrical properties.

More specifically, the construction consists of a 0.0003" paper coated with a thin coating of a cellulose acetate sorbate and thereafter metallized with zinc to a total thickness of about 0.00035". Additionally, the three paper spacers were replaced by one layer. This unit, after molding, was found to be operable at 125° C. for a period of 1000 hours with only about a 2% change in average capacitance. These units were 0.5 mfd. 400 v. sections operated on life at 1.5 times rated voltage. Similar units have been impregnated with solutions containing from about .1% to about 10% of the bifunctional member, for example, divinyl benzene, with favorable results.

As indicated above, capacitors of my invention can be provided with mineral filled thermosetting casings by heat and pressure molding cycles of any conventional type without damage to the capacitor section. This is rather remarkable in that exceptionally large sizes of capacitors can be protected in this manner for units up to 2 3/16" x 3/4" in diameter have been so molded. Also the relatively low viscosity of the monomer mixture is such that encased capacitors can be impregnated after casing, through small eyelets or other openings.

In addition to the use of paper as a dielectric spacing material, it is possible to use other porous material such as glass cloth and paper made from glass fibers; resin film such as the linear polyester formed by condensing ethylene glycol with terephthalic acid, polytetrafluoroethylene; papers laid down or fabricated from mica platelets; paper and cloths made from polyacrylonitrile, polyamides and similar fibers, as well as films of these materials; polyvinyl fluoride, silicone resins and the like.

The impregnation is ordinarily carried out at relatively low temperatures to avoid premature co-polymerization. Further it is advisably carried out in a closed system to minimize evaporation loss of the lower boiling constituents. The polymerization reaction may also be carried out in a more or less closed system, but it is advisably conducted in at least two stages beginning with lower temperatures with final treatment at temperatures in excess of 100° C.

This invention, it is felt, has widespread implications for now it is possible to impregnate capacitor sections with a remarkably excellent dielectric fluid which is converted to the thermoset state at elevated temperatures. This impregnant which can be introduced into any section having voids present, such as would exist with the dielectric spacer, functions in the thermoset state as a structural support so that the capacitor sections are not distorted during molding operations. The units are found to have a very low temperature coefficient of capacitance with a good insulation resistance at elevated temperatures, for example, in excess of 2000 megohms at room temperature, and perform excellently over extended periods of exposure under load at temperatures of 125° C. My impregnant appears to have all the useful properties of mineral oil without being deficient owing to mineral oil's liquid character when in operation.

As many apparently widely different embodiments of this invention may be made without departing from the spirit and scope hereof, it is to be understood that the invention is not limited to the specific embodiments hereof except as defined in the appended claims.

What is claimed is:

1. A method of impregnating capacitors which includes the step of providing an impregnant mixture of from about 30 to 70% of a liquid polymer of a conjugated alkadiene, from about 30 to 80% of a vinyl benzene, from about 0.1 to 3% of a peroxide polymerization catalyst, drying the capacitor at a temperature of about 125° C., cooling the dried capacitor to a temperature at which the impregnant mixture shows an extremely long pot life, introducing the impregnant into the capacitors at said long pot life temperature, and then polymerizing the impregnant in situ in the capacitors by heating them to a temperature above 125° C.

2. An electrical capacitor comprising electrodes separated by porous dielectric spacer structures, said spacer structures being impregnated with a non-polar composition of matter composed of from about 30% to 70% of a liquid polymer of a conjugated aliphatic diene containing a substantial percentage of unsaturation with from about 30% to 80% of a vinyl aromatic compound and from about 0.1% to 10% of a polyfunctional vinyl crosslinking agent together with a peroxidic catalyst to polymerize said impregnant in situ into a homogeneous thermoset mass to fill the voids of the dielectric spacer.

3. An electrical capacitor comprising at least two convolutely wound electrodes separated by a porous dielectric spacing material impregnated with a non-polar unsaturated copolymer consisting essentially of about 41% by weight of liquid polybutadiene having a molecular weight of 1500 to 2500 and a substantial percentage of unsaturation with about 53% by weight of vinyl toluene, and about 6% by weight of divinyl benzene together with a peroxidic catalyst to fill the voids formed by said porous dielectric spaced material with said impregnating copolymer whereby said capacitor has stable dielectric and structural properties at operational temperatures in excess of 150° C.

4. An electrical capacitor comprising electrodes separated by a porous dielectric spacer, said spacer being impregnated with a non-polar, polymerizable impregnant composed of from about 30% to 70% of a liquid, linear polymer of a conjugated, aliphatic hydrocarbon diene containing a substantial percentage of unsaturation with from about 30% to 80% of a vinyl aromatic monomer selected from the group consisting of styrene, vinyl biphenyl and vinyl toluene and from about 0.1% to 10% of an agent having at least two functional groups serving to cross link the linear polymer and the vinyl aromatic compound selected from the group consisting of the divinyl benzenes and the trivinyl benzenes together with a peroxidic catalyst in concentration of from 0.1% to 2% of the total impregnant, to polymerize said impregnant in situ into a homogeneous, thermoset mass to fill the voids of the dielectric spacer whereby said electrical capacitor is provided with structural and electrical stability at operation temperatures in excess of 150° C.

5. The capacitor of claim 4 contained in a molded resinous casing, said void filling impregnant in said capacitor providing structural support in said casing.

6. The capacitor of claim 4 wherein the electrodes are a metallized layer deposited upon a lacquer coated paper.

7. An electrical capacitor of claim 4 wherein said linear polymer is of polybutadiene having a molecular weight of from 1500 to 2500.

References Cited in the file of this patent

UNITED STATES PATENTS

| | | |
|---|---|---|
| 2,414,320 | Miller | Jan. 14, 1947 |
| 2,418,978 | Mertens | Apr. 15, 1947 |
| 2,476,737 | Kern | July 19, 1949 |
| 2,540,352 | Schenk | Feb. 6, 1951 |
| 2,609,353 | Rubens | Sept. 2, 1952 |
| 2,665,400 | Walker | Jan. 5, 1954 |
| 2,688,009 | Crouch | Aug. 31, 1954 |
| 2,708,645 | Norman | May 17, 1955 |

FOREIGN PATENTS

| | | |
|---|---|---|
| 499,795 | Great Britain | Jan. 30, 1939 |

OTHER REFERENCES

"Chemistry of Organic Compounds," by Noller. Published by W. B. Saunders Co., 1951. Page 657.